US010897442B2

(12) United States Patent
Presley et al.

(10) Patent No.: US 10,897,442 B2
(45) Date of Patent: Jan. 19, 2021

(54) SOCIAL MEDIA INTEGRATION FOR EVENTS (71) Applicant: International Business Machines Corporation, Armonk, NY (US)

(72) Inventors: Taylor Presley, Raleigh, NC (US); Kaleigh E. Williams, Raleigh, NC (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/983,121

(22) Filed: May 18, 2018

(65) Prior Publication Data
US 2019/0356620 A1   Nov. 21, 2019

(51) Int. Cl.
*H04L 12/58*    (2006.01)
*G06T 11/60*    (2006.01)
*G06K 9/00*     (2006.01)
*G06F 40/20*    (2020.01)

(52) U.S. Cl.
CPC .............. *H04L 51/10* (2013.01); *G06F 40/20* (2020.01); *G06K 9/00664* (2013.01); *G06T 11/60* (2013.01); *H04L 51/32* (2013.01)

(58) Field of Classification Search
CPC ......... H04L 51/10; H04L 51/32; G06F 40/20; G06F 40/284; G06F 40/30; G06K 9/00664; G06K 9/00684; G06K 9/00979; G06T 11/60
See application file for complete search history.

(56) References Cited

U.S. PATENT DOCUMENTS

| 8,558,921 B2 | 10/2013 | Walker et al. |
| 9,225,897 B1 | 12/2015 | Sehn |
| 9,407,816 B1 | 8/2016 | Sehn |
| 9,661,089 B2 | 5/2017 | Baldwin et al. |

(Continued)

OTHER PUBLICATIONS

Mell, Peter, et al., "The NIST Definition of Cloud Computing", National Institute of Standards and Technology, Special Publication 800-145, Sep. 2011, pp. 1-7.

(Continued)

*Primary Examiner* — Caroline H Jahnige
(74) *Attorney, Agent, or Firm* — Scully, Scott, Murphy & Presser, PC; Samuel A. Waldbaum, Esq.

(57) ABSTRACT

Automatically populating photograph effects such as avatars, filters, and stickers, based on events accepted and recognized by a user's social media platforms. Receiving an invite page with event details upon an acceptance of an invite, performing data analytics on the event details to determine attributes of the event and automatically identifying a plurality of photograph effects related to the event based on the attributes. Upon a first user capturing a photograph, determining the first user has accepted an invite to the event, analyzing the photograph to determine attributes and automatically determining the first user is attending the event based on the attributes. Supplying the photograph effects related to the event to the first user client device, receiving a selection of one or more of the photograph effects related to the event and routing the one or more selected photograph effects and the photograph to one or more second client devices.

19 Claims, 5 Drawing Sheets

(56) References Cited

U.S. PATENT DOCUMENTS

| | | |
|---|---|---|
| 10,038,852 B2 | 7/2018 | Kim et al. |
| 10,484,547 B2 | 11/2019 | Weeks |
| 2014/0176748 A1* | 6/2014 | Cohen ................ H04N 5/23206 348/222.1 |
| 2016/0203137 A1* | 7/2016 | Sabah .................. G06F 16/285 707/738 |
| 2017/0263029 A1* | 9/2017 | Yan .................... H04N 21/4622 |
| 2018/0115503 A1* | 4/2018 | Baldwin ................ H04L 51/08 |

OTHER PUBLICATIONS

Elise Moreau, "How to Apply Snapchat Filters", Jan. 29, 2018, pp. 1-5, https://www.lifewire.com/apply-snapchat-filters-4157939?print.
Marcela Adan Rochester, "5 Things to Know About Watson Natural Language Classifier", Jun. 10, 2017, pp. 3, https://www.ibm.com/developerworks/community/blogs/5things/entry/5_things_to_know_about_Watson_Natural_Language_Classifier?lang=en.

\* cited by examiner

SOCIAL MEDIA INTEGRATION FOR EVENTS

BACKGROUND OF THE INVENTION

This disclosure is directed to computers, and computer applications, and more particularly to computer-implemented methods and systems for providing social media integration for populating photograph effects related to an event.

Social media platforms are frequently used today to share events, milestones, invitations, etc. with family and friends. Parties, events, birthdays, anniversaries, promotions, etc. are all ways for people to share more information about their personal lives. Sharing these events are examples of connecting one's virtual persona to their real life persona and environment. One of the most common ways to connect with others is by sharing photographs of an event. Moreover, adding photograph effects can enhance the sharing experience. However, currently, photograph effects such as filters, stickers, and avatars do not take into consideration these events accepted and recognized from all social media platforms and are not customized to the user's personal events.

For example, on one social media platform, a user can manually choose generalized templates for filters and stickers based on location, weather and general events. The user must go through several steps to customize the filters and stickers, and the customization for a specific event is very limited. In some cases, the user must pay to manually create a geofilter for a specific event or location.

SUMMARY OF THE INVENTION

In one embodiment, this disclosure is directed to automatically populating custom/detailed photograph effects such as avatars, filters, and stickers, based on events accepted and recognized by all the user's social media platforms. The embodiments of the invention disclosed herein add another element of connection between user personas, and environments by using photograph effects that are populated by events through the integration of all social media platforms.

In one embodiment, a computer implemented method for providing photograph effects related to an event includes receiving at a social networking platform a notification of an acceptance of an invite to an event, in which the notification includes an invite page for the event that includes event details. The method further includes performing data analytics on the event details to determine attributes of the event and automatically identifying a plurality of photograph effects related to the event based on the attributes. The method also includes identifying when a first user has captured a photograph on a first client device, determining whether the first user has accepted an invite to the event, analyzing the photograph to determine attributes of the photograph in response to a determination that the first user has accepted an invite to the event and automatically determining whether the first user is attending the event based on the photograph attributes. The method further includes supplying the plurality of photograph effects related to the event to the first client device in response to a determination that the first user is attending the event, receiving a selection of one or more of the plurality of photograph effects related to the event and routing the one or more selected photograph effects and the photograph to one or more second client devices.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

Figure 1:
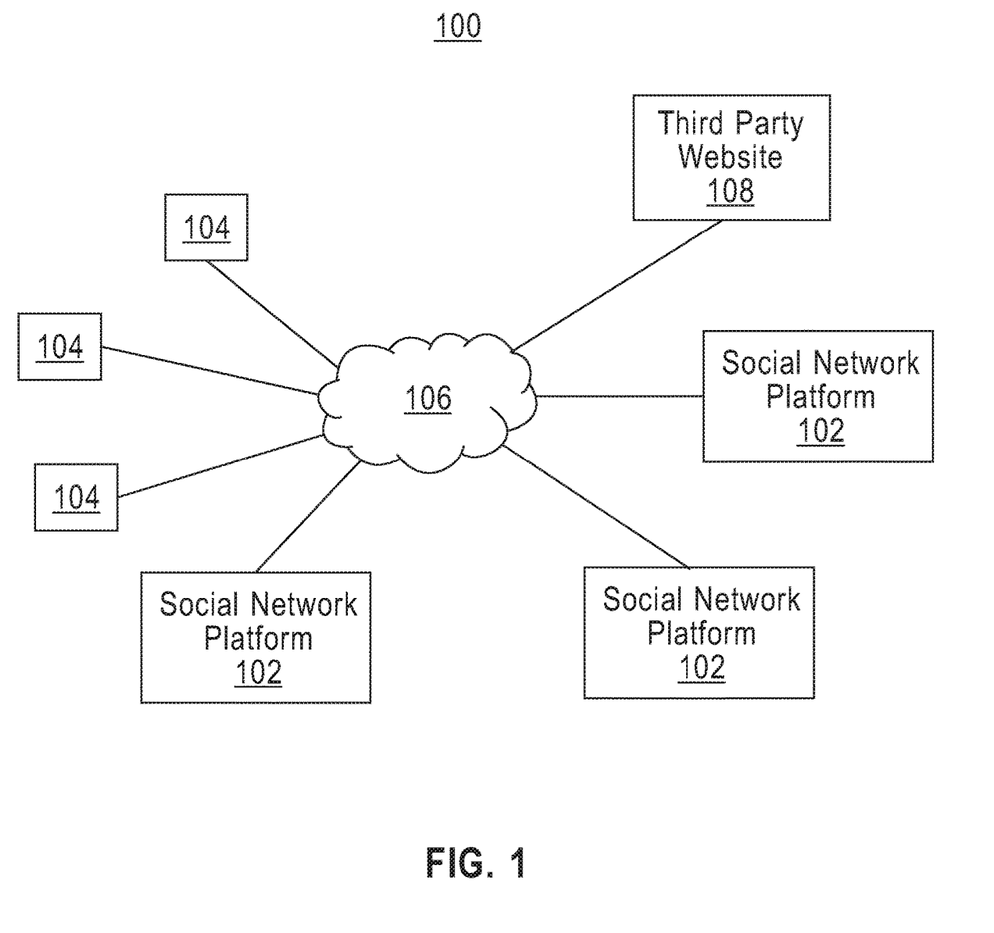
FIG. 1 is a block diagram of one embodiment of a system environment of the invention disclosed in this specification.

FIG. 1 is a high level block diagram illustrating a system environment 100 for one or more social networking platforms 102. The system environment 100 comprises one or more client devices 104, a network 106, one or more third-party websites 108 and the one or more social networking platforms 102.

The client devices 104 comprise one or more computing devices capable of receiving user input as well as transmitting and/or receiving data via the network 106. In one embodiment, a client devices 104 are a conventional computer system, such as a desktop or laptop computer. In another embodiment, client devices 104 may be a device having computer functionality, such as a mobile telephone, smartphone or similar device. The client devices 104 are configured to communicate via the network 106. In one embodiment, client devices 104 execute an application allowing a user of the client device 104 to interact with the social networking platform 102. For example, a client device 104 executes a browser application to enable interaction between the client device 104 and a social networking platform 102 via the network 106. In another embodiment, a client device 104 interacts with a social networking platform 102 through an application programming interface (API).

Figure 2:
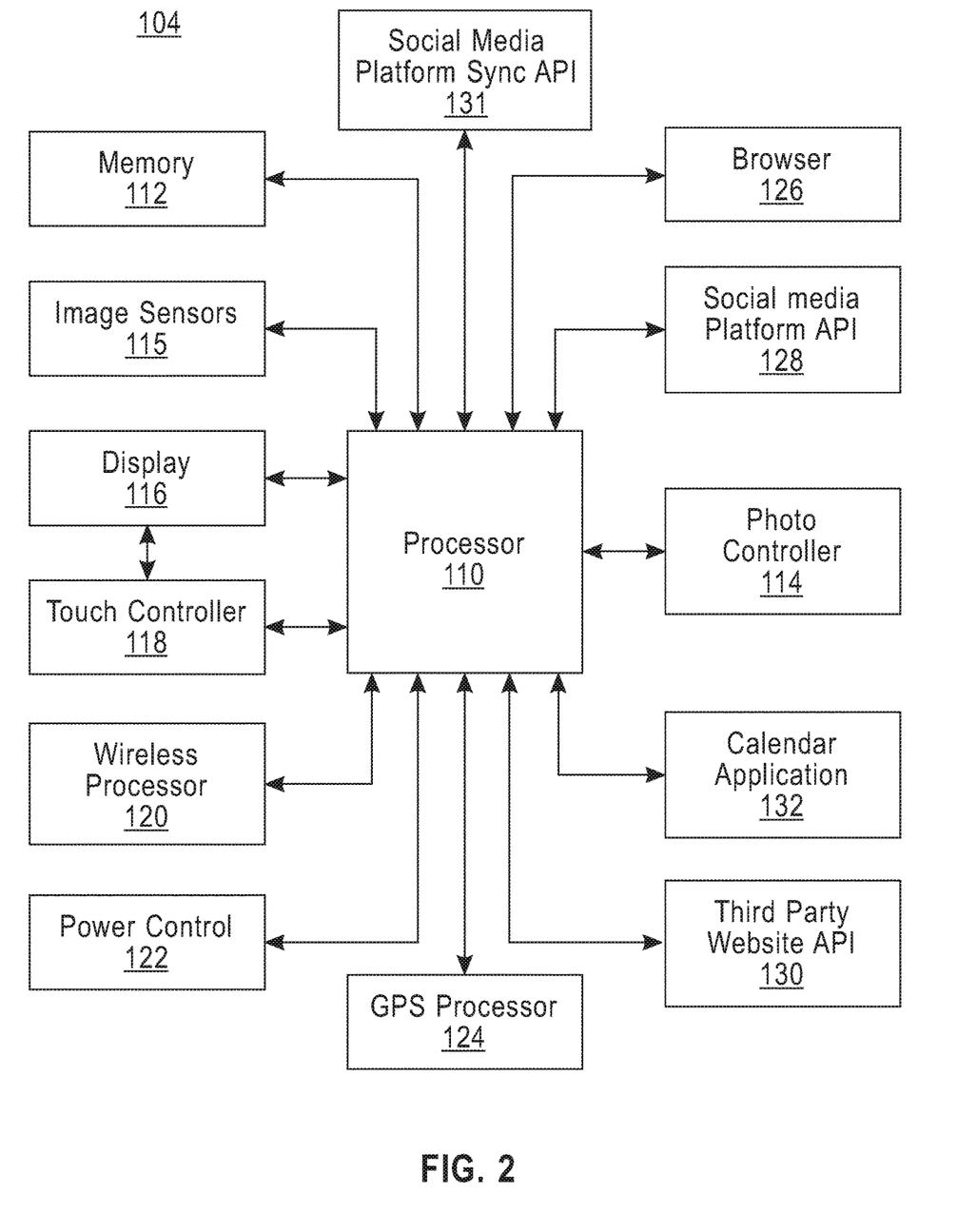
FIG. 2 is a block diagram a client device utilized in accordance with an embodiment of the invention disclosed in this specification.

FIG. 2 is a block diagram of a client device 104 utilized in accordance with an embodiment of the invention. In one embodiment, the client device 104 is a smartphone with a processor 110 in communication with a memory 112. The processor 110 may be a central processing unit and/or a graphics processing unit. The memory 112 is a combination of flash memory and random access memory. The memory 112 stores a photo controller 114. The photo controller 114 includes executable instructions to coordinate the capture, display and archiving of digital photographs. The photo controller 114 may include photo filter processing which may be augmented by photo filter processing that is described below in connection with a social media platform photo effects module.

The processor 110 is also coupled to image sensors 115. The image sensors 115 may be known digital image sensors, such as charge coupled devices. The image sensors capture visual media, which is presented on display 116, as coordinated by the photo controller 114.

A touch controller 118 is connected to the display 116 and the processor 110. The touch controller 118 is responsive to haptic signals applied to the display 116. In one embodiment, the photo controller 114 monitors signals from the touch controller 118 to coordinate the capture, display and archiving of digital photographs. The client device 104 may also include other components commonly associated with a smartphone, such as a wireless signal processor 120 to support wireless communications, a power control circuit 122 and a global positioning system processor 124. The client device 104 may also include browser application 126 and social media platform API 128 for accessing social media platforms 102. Client device 104 may further include one or more third party website APIs 130 for accessing the one or more third party websites 108. Client device 104 may also include a social media platform sync API 131, such as a social media dashboard. Client device 104 may also include calendar application 132. Calendar application 132 allows the user to send calendar invitations to other users and make calendar entries for events the user plans to attend. In addition, when the client device 104 receives an invitation to an event from a social media platform 102 or from a third party website 108, calendar application 132 will automatically make a calendar entry to the event when the user undertakes an action on the client device 104 to accept the invitation.

Figure 3:
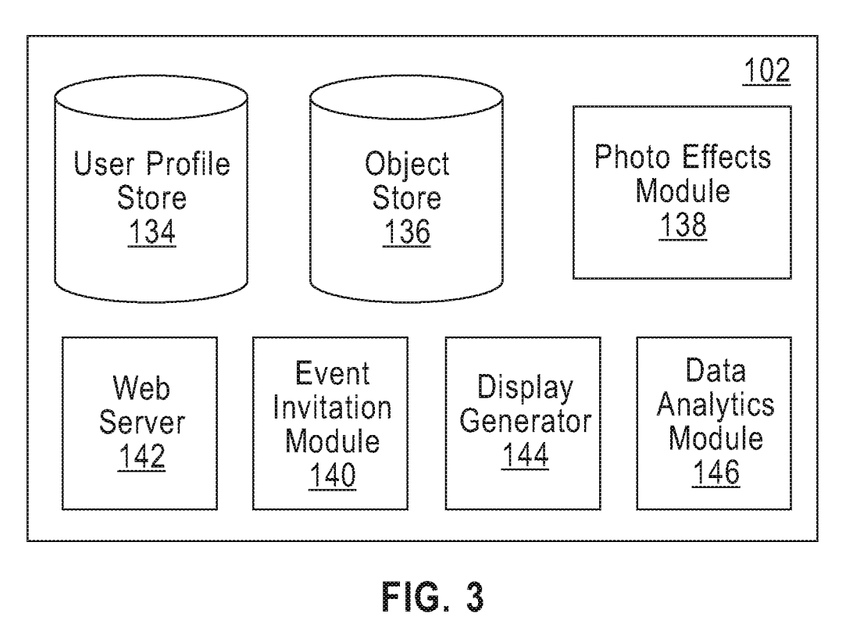
FIG. 3 is a block diagram of a system architecture of one embodiment of a social networking platform of the invention disclosed in this specification.

FIG. 3 is an example block diagram of a system architecture of one embodiment of the social networking platform 102. The social networking platform 102 includes a user profile store 134, an object store 136, a photo effects module 138, an event invitation module 140, a display generator 144, and a web server 142. In other embodiments, the social networking system 102 may include additional, fewer, or different modules for various applications. Conventional components such as network interfaces, security functions, load balancers, failover servers, management and network operations consoles, and the like are not shown so as to not obscure the details of the system architecture.

The object store 136 stores information describing objects associated with the social networking platform 102. Objects may include a variety of data, such as pages associated with a user or with an entity, actions performed by users, images, videos, audio files or other data maintained by the social networking platform 102.

The object store 136 includes events associated with the social networking platform 102. An event may be defined for a real-world event, such as a birthday party. A user interested in attending the event may establish a connection with an object associated with the event (the "event object"). A user may create the event object by defining information about the event such as a name of event, time, a location and a list of users invited to the event ("a guest list"). Invitations to the event are sent to the users included on the guest list, and those users may reply to the invitation with an acceptance state. Additionally, users may comment on the event, post their own content (e.g., pictures from the event), and perform any other actions enabled by the social networking platform 102. Accordingly, the user creating the event as well as the users included on the guest list for the event may perform various actions that are associated with that event. The object store 136 includes data describing events, including one or more pages associated with an event.

Figure 4:
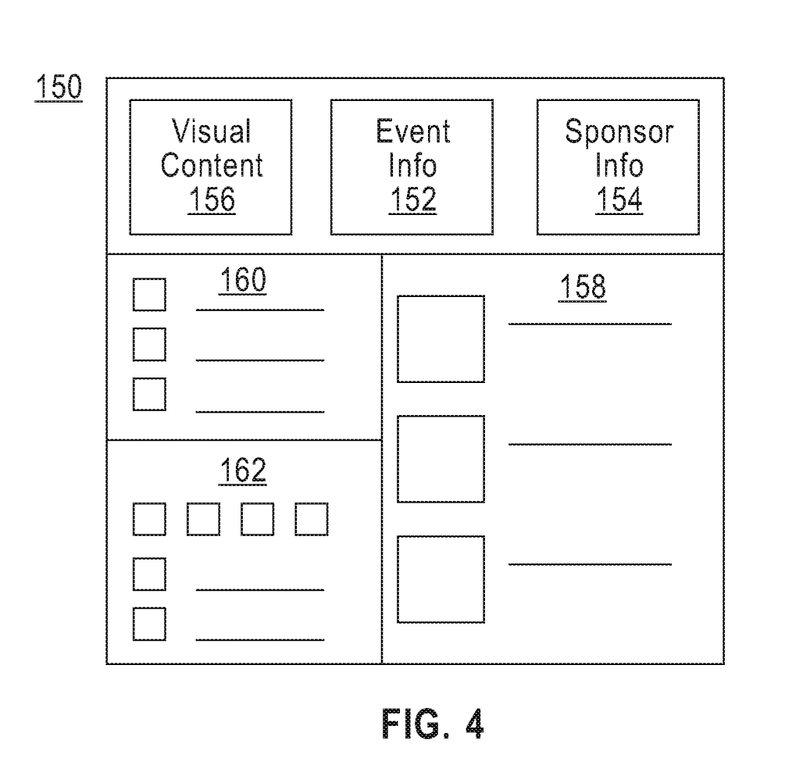
FIG. 4 illustrates an event page associated with an event utilized in accordance with an embodiment of the invention disclosed in this specification.

FIG. 4 is an example of an event page 150. The event page 150 may be generated by a social network platform 102 or from a third party website. The event page 150 is associated with an event created via the social networking platform 102 or third party website 108. In some embodiments, the event page 150 is presented to a user of the social networking platform 102 when the user accesses an invitation to an event or when the user accesses a link to the event, such as through a newsfeed story. An event page 150 typically provides event information 152, such as the name, location, time, and a description of the event. The event page may also include sponsor information 154 from a third party sponsor. The sponsor information may include general brand information of the sponsor and/or specific brand information for the event. The event page 150 may also include visual content 156 related to the event such as a design frame and/or background, a photo or a video specific to the event. Event page 150 may further include an event wall 158 where comments or other content received from users is posted for viewing by additional users. Users invited to an event receive an invitation to the event from the social networking platform 102 or third party website 108. When an invited user provides a response to the invitation, the social networking platform 102 or third party website associates an acceptance state with the invited user that is based on the response. The various acceptance states 160 of the invitees may be shown on the event page 150. The event page 150 may also include a section 162 for the user to notify one or more of the user's social media platforms that the user has accepted the invitation. For each social media platform checked in section 162, the event page will be sent to that social media platform. The event page may be sent via a sync function within the current social media platform or third party website that sent the invitation of via the social media platform sync API 131.

Figure 5:
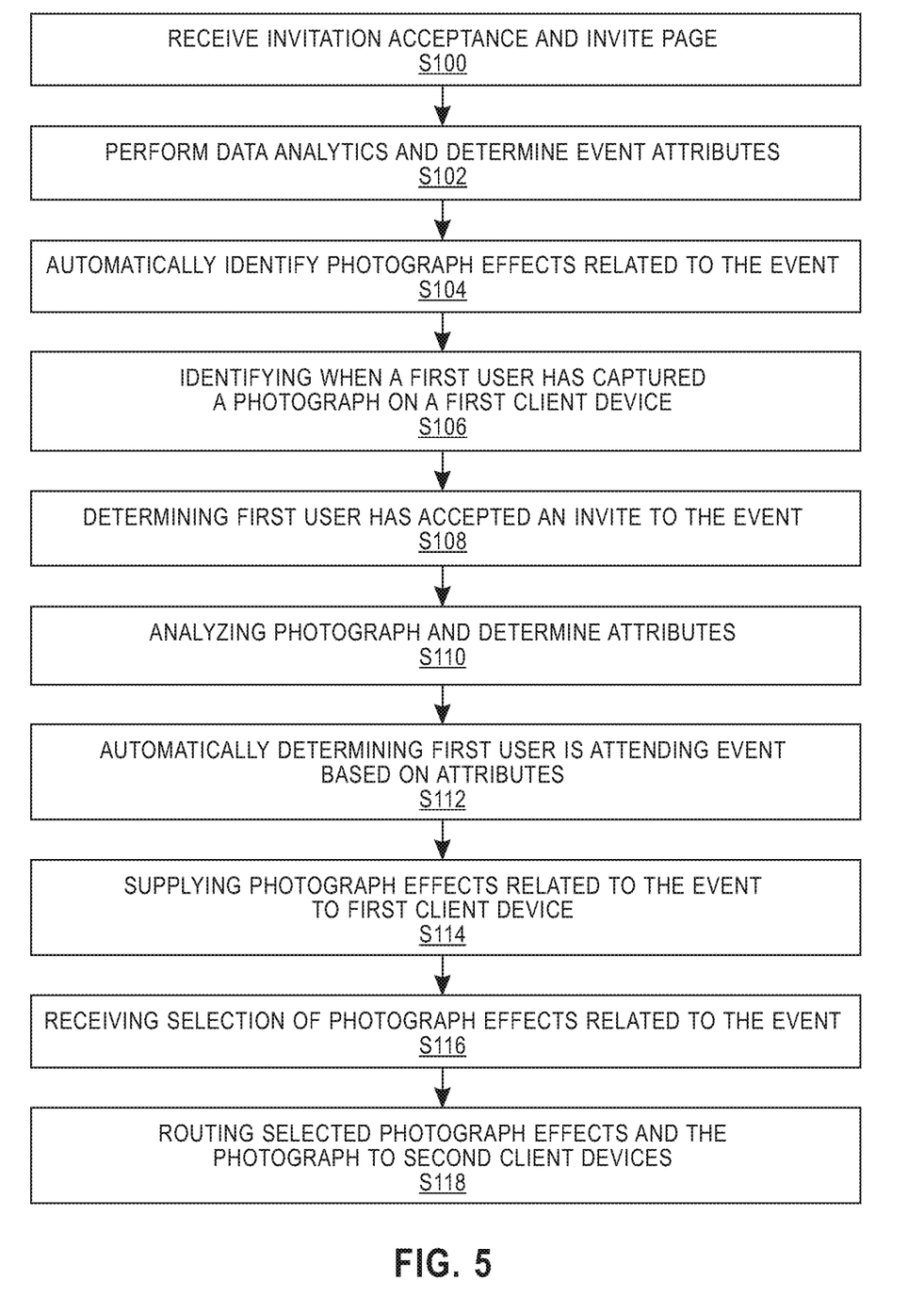
FIG. 5 is a flow diagram of one embodiment of a method of the invention disclosed in this specification.

FIG. 5 illustrates the processing operations associated with an embodiment of the invention. In one embodiment, the operations of a computer implemented method for providing photograph effects related to an event are performed by the photo effects module 138 of the social networking platform 102.

The method begins at step S100 of the photo effects module 138 receiving from a client device 104 a notification of an acceptance of an invite to an event. The acceptance notification may be sent by the social media platform API 128 or the social media platform sync module 131. The acceptance notification will include the invite page 150 for the event, which includes the event details such as event info 152, sponsor info 154 and visual content 156. The event page may have been sent to the client device 104 by event invitation module 140 or from a third party website 108. In one embodiment, the event page may be a calendar entry in calendar application 132 of the client device 104. The calendar application will have an option upon the acceptance of a calendar invitation for the user to send the calendar event page to the user's social media platforms as described above.

In step S102 data analytics are performed on the event details to determine attributes of the event. In one embodiment, data analytics module 146 is located on the social media platform 102. In another embodiment, data analytics module 146 is located on a third party website, which may optionally be accessed through a cloud service.

In step S102, the data analytics module 146 will recognize the type of event, such as birthdays, concerts, sporting events, fundraisers, holiday parties, conferences, local meet-ups, etc. The data analytics module 146 will analyze the event content taken from the event page 150, such as event title, event description, event location, event time, sponsor name, etc. The analysis may include photo and/or video analytics if photographs, videos or other graphics are included on the event page. The data analytics module 146 will extract terms from the event page 150 in order to determine attributes of the event that can be used to identify types of photo effects that are relevant. In one embodiment, data analytics module 146 uses keyword extraction and taxonomy extraction. In one embodiment, data analytics module 146 uses the Watson Natural Language Classifier that applies cognitive computing techniques and machine learning to extract terms from the event page 150 in order to determine attributes of the event that can be used to identify types of photo effects that are relevant.

In step S104, the photo effects module 138 automatically identifies a plurality of photograph effects from the object store 136 that are related to the event based on the attributes determined by the data analytic module 146. These relevant photo effects are tagged or otherwise marked in the object store 136 as being related to the event. In one embodiment, the photo effects in object store 136 are tagged with certain topics, for example an image of a birthday cake can be tagged "Cake", "Birthday", etc. When new photo effects are added to the object store 136 they are tagged for relevant topics.

In one embodiment, step S104 includes automatically generating one or more photograph effects related to the event based on the attributes, which optionally may include using information on the event available from a sponsor of the event. In one embodiment of step S104, for a given topic, the photo effects module 138 selects relevant image filters, avatars, and stickers in object store 136 based on the recognized attributes. In one example, a person may have just accepted a new job and has posted an invitation for a local meet-up to celebrate. The photo effects module 138 will identify filters, avatars, and stickers related to the new job, such as a Bitmoji in a suit carrying a briefcase, and a filter with the new job title.

Step S104 may also include in one embodiment automatically modifying one or more of the plurality of photograph effects based on information on the event available from the event page 150. For example, a photo effect stored in object store 136 may be modified by adding sponsor information such as brand indicia or a specific logo of the event. In one optional embodiment, the photo effects module 138 can modify the photo effects based on various event factors such as the number of people accepted/invited, how much time is left until the event, a location change of the event, etc.

As described above, the event page 150 may be sent via a sync function within a social media platform API 128 or the social media platform sync API 131 to all or selected ones of the user's social media platforms. Each of these social media platforms having a photo effects module 138 and data analytics module 146 performs step S100 and S102. Therefore, all of these social media platforms will have photo effects related to the event ready to be populated to any users that accepts an invitation to the event. Therefore, no matter which social media platform the user thereafter accesses to share a photo of the event, event related photo effects will populated to the user for selection and adding to their photo.

At the time of the event, a user takes a photograph using a photo sharing function of a social media platform 128. The photo effects module 138 performs step S106 of identifying when a first user has captured a photograph on a first client device 104. The photo effects module 138 performs step S108 of determining whether the first user has accepted an invite to the event. The photo effects module 138 then performs step S110 of analyzing the photograph to determine attributes of the photograph in response to a determination that the first user has accepted an invite to the event and step S112 of automatically determining whether the first user is attending the event based on the photograph attributes.

The photo effects module 138 then performs step S114 of supplying the plurality of photograph effects related to the event stored in object store 136 to the first client device in response to a determination that the first user is attending the event. The photo effects module 138 then performs step S116 of receiving a selection of one or more of the plurality of photograph effects related to the event and step S118 of routing the combined one or more selected photograph effects and the photograph to one or more second client devices 104 selected by the user of the first client device 104.

In one embodiment, upon a person joining the event and/or declining the event, the people that are in the event can get alerts to send that person an image with a relevant photo effect. For example, if person one joined an event and later person two joins the event, person one may get an alert on her client device that says "person two just joined the event with you! Send her an image with a personalized filter now!"

Figure 6:
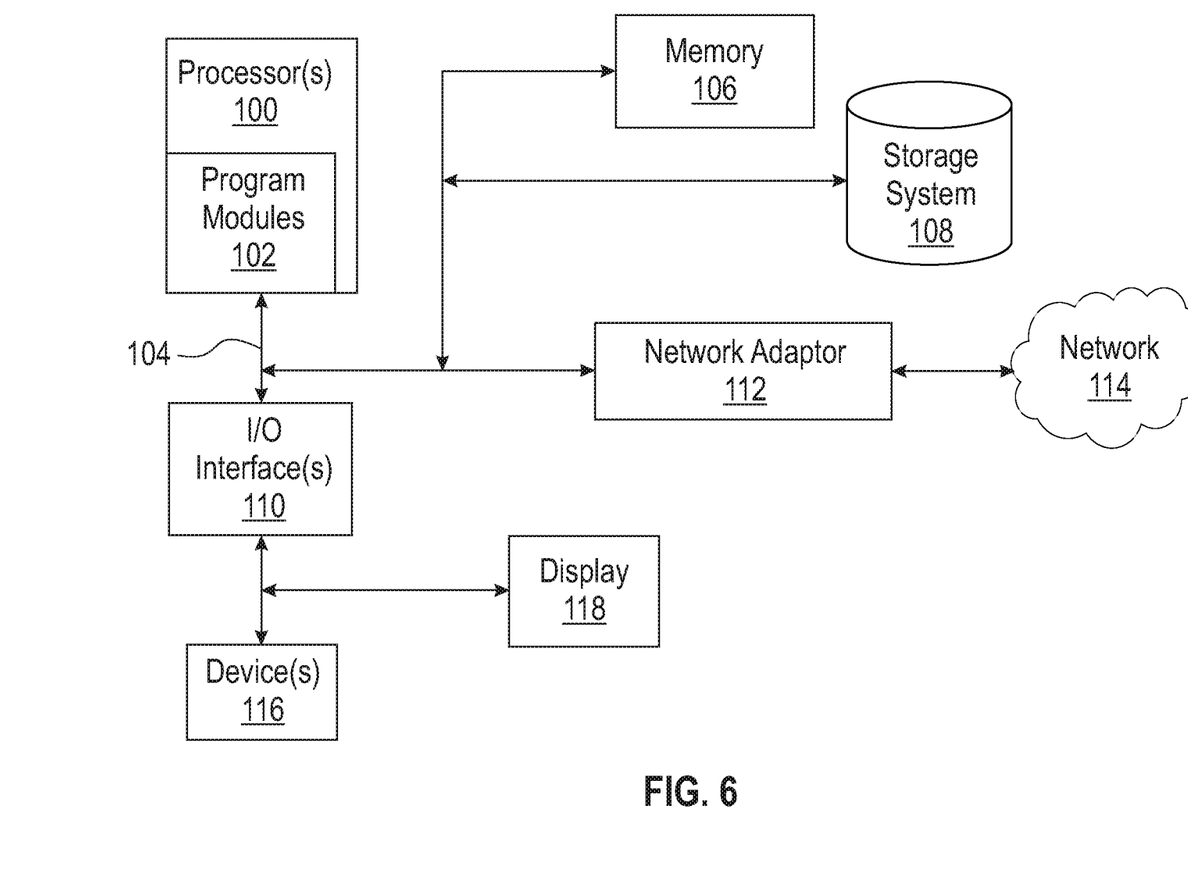
FIG. 6 is a block diagram of an exemplary computing system suitable for implementation of the embodiments disclosed in this specification.

FIG. 6 illustrates a schematic of an example computer or processing system that may implement the method for providing photograph effects related to an event in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, smartphones, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for providing photograph effects related to an event comprising:
   receiving at a social networking platform a notification of an acceptance of an invite to an event, the notification including an invite page for the event, the invite page including event details, the social networking platform performing the steps of;
   performing data analytics on the event details to determine attributes of the event;
   automatically identifying a plurality of photograph effects related to the event based on the attributes;
   identifying when a first user has captured a photograph on a first client device;
   determining whether the first user has accepted the invite to the event;
   analyzing the photograph to determine attributes of the photograph in response to a determination that the first user has accepted the invite to the event;
   automatically determining whether the first user is attending the event based on the photograph attributes;
   supplying the plurality of photograph effects related to the event to the first client device in response to a determination that the first user is attending the event;
   receiving a selection of one or more of the plurality of photograph effects related to the event; and
   routing the one or more selected photograph effects and the photograph to one or more second client devices; and
   receiving the acceptance of the invite to the event at the first client device, the event invite including the invite page for the event, the first client device performing the steps of;
   receiving a selection to notify one or more second social networking platforms of the acceptance of the invite to the event; and
   sending the notification of the acceptance of the invite to the event to the first social networking platform and the one or more selected second social networking platforms, the notification including the invite page for the event.

2. The computer implemented method of claim 1, further including automatically generating one or more photograph effects related to the event based on the attributes.

3. The computer implemented method of claim 2, wherein automatically generating one or more photograph effects includes using information on the event available from a sponsor of the event.

4. The computer implemented method of claim 1, further including automatically modifying one or more of the plurality of photograph effects based on information on the event available from a sponsor of the event.

5. The computer implemented method of claim 1, wherein the plurality of photograph effects are selected from the group consisting of filters, stickers and avatars.

6. The computer implemented method of claim 1, wherein performing data analytics on the event details including using natural language analytics on the invite page.

7. A computer system for providing photograph effects related to an event, comprising:
- a first social networking platform server comprising one or more computer processors, one or more non-transitory computer-readable storage media, and program instructions, stored on the one or more non-transitory computer-readable storage media, which when implemented by the one or more processors, cause the a first social networking platform server to perform the steps of:
- receiving a notification of an acceptance of an invite to an event, the notification including an invite page for the event, the invite page including event details;
- performing data analytics on the event details to determine attributes of the event;
- automatically identifying a plurality of photograph effects related to the event based on the attributes;
- identifying when a first user has captured a first photograph on a first client device;
- determining whether the first user has accepted the invite to the event;
- analyzing the photograph to determine attributes of the first photograph in response to a determination that the first user has accepted the invite to the event;
- automatically determining whether the first user is attending the event based on the first photograph attributes;
- supplying the plurality of photograph effects related to the event to the first client device in response to a determination that the first user is attending the event;
- receiving a selection of one or more of the plurality of photograph effects related to the event; and
- routing the one or more selected photograph effects and the first photograph to one or more second client devices; and
- one or more non-transitory computer-readable storage media on the first client device, and program instructions, stored on the one or more first client device non-transitory computer-readable storage media, which when implemented by one or more processors of the first client device, cause the a first client device to perform the steps of:
- receiving the acceptance of the invite to the event, the event invite including the invite page for the event;
- receiving a selection to notify one or more second social networking platforms of the acceptance of the invite to the event; and
- sending the notification of the acceptance of the invite to the event to the first social networking platform and the one or more selected second social networking platforms, the notification including the invite page for the event.

8. The computer system of claim 7, further including automatically generating one or more photograph effects related to the event based on the attributes.

9. The computer system of claim 8, wherein automatically generating one or more photograph effects includes using information on the event available from a sponsor of the event.

10. The computer system of claim 7, further including automatically modifying one or more of the plurality of photograph effects based on information on the event available from a sponsor of the event.

11. The computer system of claim 7, wherein the plurality of photograph effects are selected from the group consisting of filters, stickers and avatars.

12. The computer system of claim 7, wherein performing data analytics on the event details including using natural language analytics on the invite page.

13. The computer system of claim 7, further including program instructions causing the first client device to perform the steps of:
- sending a notification to one of the one or more selected second social networking platforms that the first client device has captured a second photograph;
- receiving the plurality of photograph effects related to the event from the selected second social networking platform, in response to a determination that the first user is attending the event;
- receiving a selection of one or more of the plurality of photograph effects related to the event received from the selected second social networking platform; and
- routing the one or more selected photograph effects received from the selected second social networking platform and the second photograph to one or more second client devices.

14. A computer program product comprising:
- a first computer-readable storage medium having a first set of program instructions stored thereon and a second computer-readable storage medium having a second set of program instructions stored thereon, where execution of the first set of program instructions using a computer causes the computer to perform a method for providing photograph effects related to an event, comprising:
- receiving at a social networking platform a notification of an acceptance of an invite to an event, the notification including an invite page for the event, the invite page including event details;
- performing data analytics on the event details to determine attributes of the event;
- automatically identifying a plurality of photograph effects related to the event based on the attributes;
- identifying when a first user has captured a photograph on a first client device;
- determining whether the first user has accepted the invite to the event;
- analyzing the photograph to determine attributes of the photograph in response to a determination that the first user has accepted the invite to the event;
- automatically determining whether the first user is attending the event based on the photograph attributes;
- supplying the plurality of photograph effects related to the event to the first client device in response to a determination that the first user is attending the event;

receiving a selection of one or more of the plurality of photograph effects related to the event; and routing the one or more selected photograph effects and the photograph to one or more second client devices; and receiving the acceptance of the invite to the event at the first client device, the event invite including the invite page for the event, the first client device having the second computer-readable storage medium having the second set of program instructions stored thereon;

where execution of the second set of program instructions stored on the second computer-readable storage medium using a second computer causes the second computer to perform:

receiving a selection to notify one or more second social networking platforms of the acceptance of the invite to the event; and sending the notification of the acceptance of the invite to the event to the first social networking platform and the one or more selected second social networking platforms, the notification including the invite page for the event.

15. The computer program product of claim 14, further including automatically generating one or more photograph effects related to the event based on the attributes.

16. The computer program product of claim 15, wherein automatically generating one or more photograph effects includes using information on the event available from a sponsor of the event.

17. The computer program product of claim 14, further including automatically modifying one or more of the plurality of photograph effects based on information on the event available from a sponsor of the event.

18. The computer program product of claim 14, wherein the plurality of photograph effects are selected from the group consisting of filters, stickers and avatars.

19. The computer program product of claim 14, wherein performing data analytics on the event details including using natural language analytics on the invite page.

* * * * *